J. Y. STEWART.
SHOCK ABSORBER.
APPLICATION FILED DEC. 14, 1915.
1,212,837.
Patented Jan. 16, 1917.
2 SHEETS—SHEET 1.
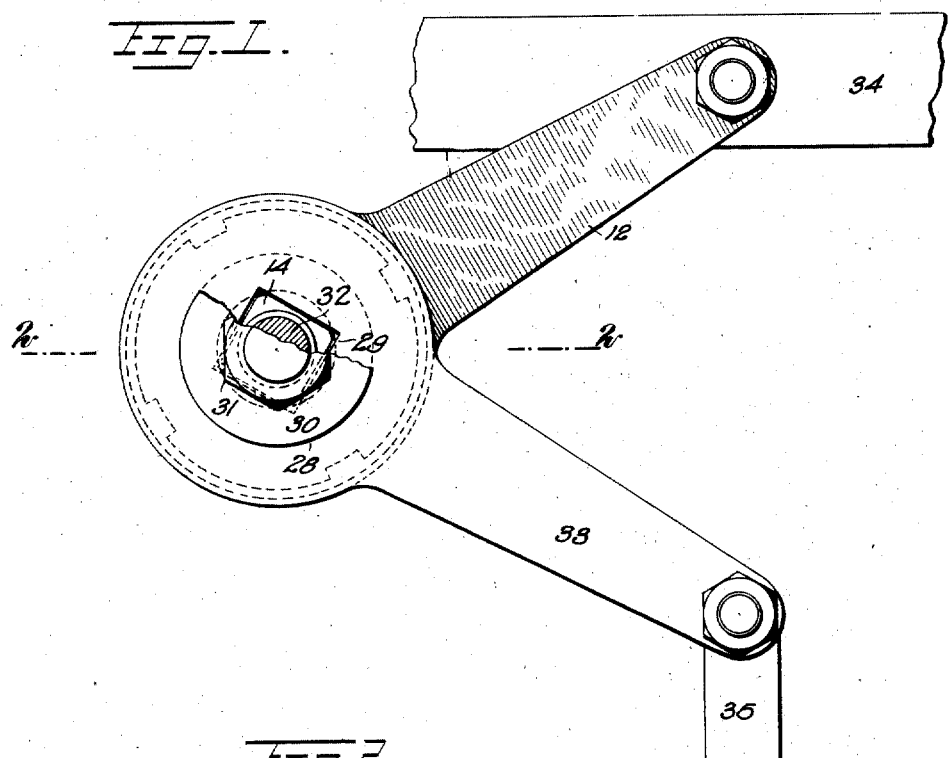
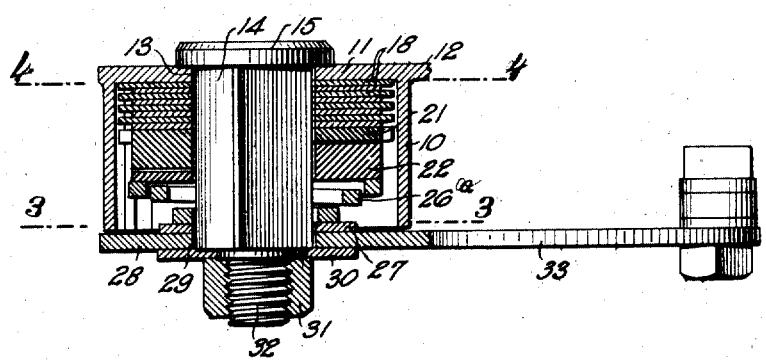
WITNESSES
H. T. Walker
L. B. Marshall
INVENTOR
James Y. Stewart
BY Munn & Co
ATTORNEYS

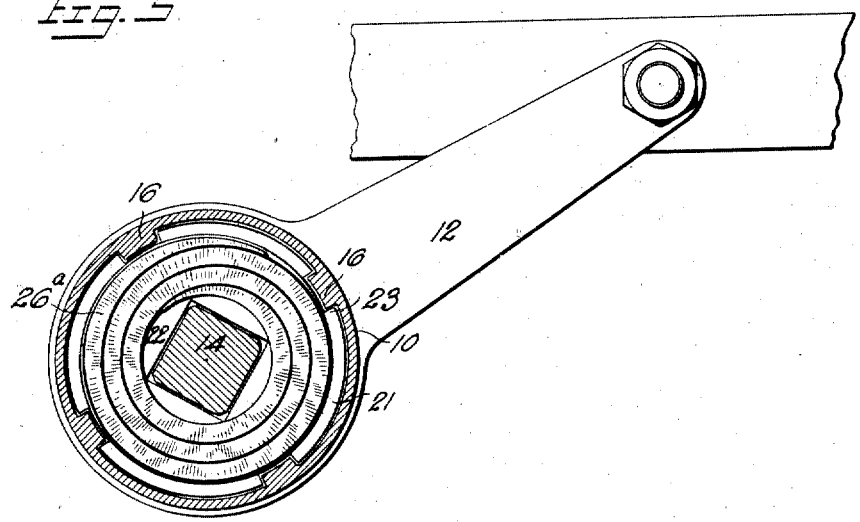
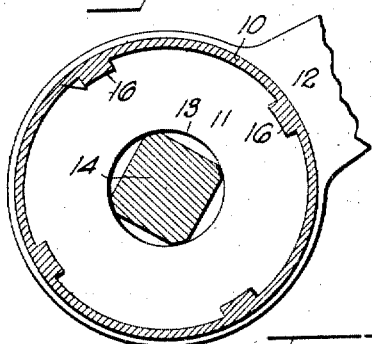
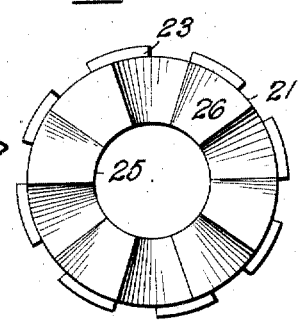
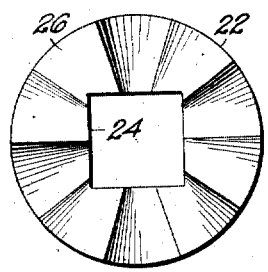
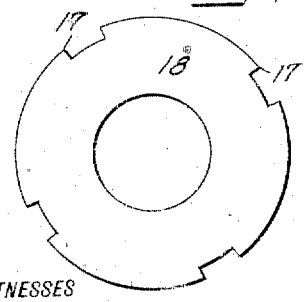
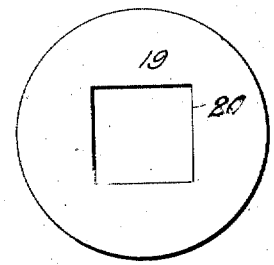

UNITED STATES PATENT OFFICE.

JAMES Y. STEWART, OF VAN HOUTEN, NEW MEXICO.

SHOCK-ABSORBER.

1,212,837.   Specification of Letters Patent.   Patented Jan. 16, 1917.

Application filed December 14, 1915. Serial No. 66,714.

*To all whom it may concern:*

Be it known that I, JAMES Y. STEWART, a citizen of the United States, and a resident of Van Houten, in the county of Colfax and State of New Mexico, have invented a new and Improved Shock-Absorber, of which the following is a full, clear, and exact description.

My invention has for its object to provide a shock absorber which may be adjusted relatively to the chassis and the running parts of an automobile. This adjustment may be made with reference to the position of the chassis relatively to the running parts of the automobile, with reference to the desired resistance of the shock absorber, and also in a manner which will provide a neutral zone where the shock absorber will not function, thereby permitting the support of the chassis under normal conditions by the automobile springs and independently of the shock absorber. With this construction, the shock absorber will not function until the chassis is moved relatively to the running parts beyond normal running position, the shock absorber then operating to limit the movement of the chassis relatively to the running parts, the resistance of the shock absorber increasing as the chassis moves farther from normal running position.

Still other objects of the invention will appear in the following specification, in which the preferred form of my invention is described.

Reference is had to the accompanying drawings, in which similar reference characters denote similar parts in all the views, in which—

Figure 1 is a side elevation of my invention, with parts broken away to show parts of the construction; Fig. 2 is a sectional view on the line 2—2 of Fig. 1; Fig. 3 is a sectional view on the line 3—3 of Fig. 2; Fig. 4 is a sectional view on the line 4—4 of Fig. 2; Figs. 5 and 6 are views showing the companion thrust members; Fig. 7 and 8 are views showing the friction disks; and Fig. 9 is an end view of the thrust members, showing how their cam surfaces contact with each other under normal conditions.

By referring to the drawings, it will be seen that a casing 10 is provided having a head 11 integral therewith, an arm 12 extending from this head 11 in a manner well understood. In the head 11 there is an opening 13 in which a bolt 14 is disposed, the bolt 14 having a head 15 which abuts against the casing head 11 at the sides of the opening 13 therein. This bolt 14 is angular in cross section, as will best be seen by referring to Figs. 3 and 4 of the drawings, but nevertheless, the opening 13 in the head 11 is so constructed that the bolt 14 may freely rotate in the said opening. In the casing 10 there are radial ribs 16, which extend inwardly from the sides of the casing. These ribs 16 are disposed in recesses 17 at the peripheries of disks 18, these disks 18 being rotatably mounted on the bolt 14, there being disposed between the disks 18, disks 19 which contact with the disks 18, and which are mounted to rotate with the bolt 14, the disks 19 having angular openings 20 which fit the bolt 14 so that there will be no question of the disks 19 rotating when the bolt 14 rotates. These disks 18 and 19 are friction disks, and contact with each other, it being understood that any desired number of these disks may be provided, with reference to the size of the casing and other conditions. These disks 18 and 19 are pressed together in the direction of the head 11 by companion thrust members 21 and 22, the thrust member 21 having recesses 23 in which the ribs 16 may be disposed, so that the thrust member 21 will rotate with the casing, and the thrust member 22 having its opening 24 angular in shape so that it will fit the bolt 14 and rotate with the said bolt.

The opening 25 in the thrust member 21 is round, so that the thrust member 21 will rotate freely on the bolt. These thrust members 21 and 22 have contacting cam surfaces 26, so that when one of the thrust members is rotated relatively to the other thrust member, the thrust members will be forced away from each other by the said cam surfaces, and when the thrust member 22 is prevented from moving away from the head 11, it will force the thrust member 21 in the direction of the said head by binding the friction disks 18 and 19. Disposed around the bolt 14, and pressing against the thrust member 22, there is a spring 26ᵃ, a washer 27 being disposed against the said spring and being engaged by a head 28 which has an angular opening 29 fitting the angular portion of the bolt 14, so that the head 28 will rotate the bolt 14. A washer 30 is disposed at the outer side of the head 28, and it is engaged by a nut 31 which meshes with a threaded terminal 32 with which the bolt 14 is provided. Extending from the head 28 there is an arm 33, it being possible to secure the arm 12 to a chassis 34, and the arm 33 to a running portion 35 of an automobile, so that the shock absorber will operate in the customary manner.

It will be understood that if desired the washer 27 may be removed, and that one or more of the friction disks 18 and 19 may also be removed, to give as much freedom of action as required between the thrust members 21 and 22. By this means, it is possible to so adjust the shock absorber that the arms 12 and 33 may move any desired distance relatively to each other before the shock absorber will function by the cam surfaces 26 on one of the thrust members riding up on the cam surfaces 26 of the other thrust members far enough to force the friction disks 18 and 19 apart. It is also possible to so construct the cam surfaces 26 of the thrust members 21 and 22 as to increase the thrust at any desired rate, with the continued movement of the arm 12 relatively to the arm 33. It is also possible to adjust the shock absorber on the automobile without reference to the distance of the running part 35 from the chassis 34, and at the same time to insure that the shock absorber will not impair the value of the resiliency of movement of the automobile springs when the automobile is running under normal conditions. To facilitate this arrangement, I provide the thrust member 21 with a greater number of recesses 23 than there are ribs 16, so that the position of the thrust member 21 may be adjusted exactly with reference to the casing 10, that the companion thrust member 22, when its cam surfaces 26 rest snugly against the cam surfaces 26 on the thrust member 21 may be so positioned with reference to the bolt 14, that the head 28 may be disposed in place with its arm 33 extending at the desired angle relatively to the arm 12.

Having thus described my invention, what I claim as new, and desire to secure by Letters Patent, is:

In a shock absorber, a casing having sides and a head with an opening, an arm extending from the casing, radial ribs extending inwardly around the side of the casing, a bolt rotatably disposed at the opening in the head and provided with a shoulder, two companion cam members disposed in the casing around the bolt, one of the cam members engaging the shoulder of the bolt to rotate with the latter, and the other cam member having recesses in its periphery in which the ribs are disposed, the ribs being disposed apart in the periphery of the cam member to permit of the rotation of one of the cam members relatively to the other to adjust the cam surfaces of one of the cam members relatively to the cam surfaces of the other cam member, a spring disposed within the casing against the outer cam member and around the bolt, a second head disposed at the spring for closing the casing, the second head engaging the shoulder of the bolt for rotating the latter, an arm extending from the second mentioned head, a nut on the bolt at the side of the second mentioned head for holding the second mentioned head in position, and a plurality of disks disposed around the bolt between the cam members and the first mentioned head, alternate disks having recesses in their peripheries in which the ribs on the casing are disposed, the remaining disks engaging the shoulder on the bolt to rotate therewith, the number of the disks employed being determined by the amount of free play desired between the said two arms.

In testimony whereof I have signed my name to this specification in the presence of two subscribing witnesses.

JAMES Y. STEWART.

Witnesses:
THOMAS W. WALLBANK,
FRED HARPOLE.